Feb. 20, 1973 K. C. MANDAS 3,716,915
GUIDE AND CUTTER
Filed March 10, 1970 2 Sheets-Sheet 2

INVENTOR.
KENNETH C. MANDAS
BY Popper, Bain & Bobis
ATTORNEYS

3,716,915
Patented Feb. 20, 1973

3,716,915
GUIDE AND CUTTER
Kenneth C. Mandas, 79 A Linn Drive,
Verona, N.J. 06120
Filed Mar. 10, 1970, Ser. No. 18,088
Int. Cl. B26b 29/00
U.S. Cl. 30—293                                8 Claims

ABSTRACT OF THE DISCLOSURE

A guide and cutter for trimming relatively hard, brittle plastics or plastic like veneer such as Formica in which a double edged, wedge-shaped rotory cutter severs excess overhang leaving a clean, shaped and relatively finished surface, the rotory cutter being driven by any suitable motor supported by a guide attached thereto which guide orients the cutter during severence and provides control for the depth of cut while permitting continuous observation of the cutter from above the overhang.

BACKGROUND OF THE INVENTION

When plastic veneer such as Formica or the like is applied to a surface such as a counter, table top, desk or the like, it is rarely if ever pre-cut to an exact size. Rather, the veneer is rough cut to an oversize and applied to the surface by glue or adhesive. The excess overhang is then removed.

Veneers such as Formica are extremely hard and brittle and therefore very difficult to cut. Previously, excess overhang has been oblatively worn away by the use of a routing tool which is applied to the outer edge of the overhang and worked inwardly, destroying and wearing away the mass of the overhang until the abutting surface is reached. Obviously, such a procedure is excessively time consuming. Moreover, routing tools produce a scalloped or scooped out cut edge which must receive considerable hand finishing.

It is desirable to sever the overhang rather than oblatively wear it away. In addition, it is desirable to employ a cutting instrument capable of generating a relatively clean cut surface needing little or no hand finishing.

It is among the objects and advantages of the present invention to provide a guide and cutter for the severance of overhang by means of a rotary cutting instrument, the axis of rotation of which is generally parallel to and slightly above the plane of the work surface to which the veneer has been applied, the cutting instrument generating a slightly beveled cut through the overhang severing a desired portion thereof and generating a relatively finished cut edge.

It is also among the objects and advantages of the present invention to provide a guide for the cutting instrument aforesaid which provides both vertical support for the cutter and its power source as well as control over the level of the axis of rotation of the cutting instrument and the depth of cut without obstructing visual observation of the cutting operation by the operator.

SUMMARY OF INVENTION

A guide and cutter comprising, a flat panel, a wall guide mounted on the panel at one end thereof, an edge on the wall guide positioned beneath the plane of the said panel and spaced away from and extending generally along the said end of the panel to which the wall guide is mounted, and a rotary cutting instrument mounted above the bottom of the plane of the panel with its axis of rotation generally parallel to the plane of the said panel, the cutting end of the cutting instrument lying between the said edge on the wall guide and the said end of the panel to which the wall guide is mounted.

A cutter comprising a rotatable shaft, a flat, generally diamond-shaped blade muonted on one end of the shaft and having a pair of diametrically opposed tips, the plane of the blade being generally coincident with the axis of the shaft, the opposed tips of the blade being equidistant from the axis of rotation of the shaft.

PREFERRED EMBODIMENT OF INVENTION

The objects and advantages aforesaid as well as other objects and advantages may be achieved by the guide and cutter described and claimed herein and illustrated in the drawings in which:

Figure 1:
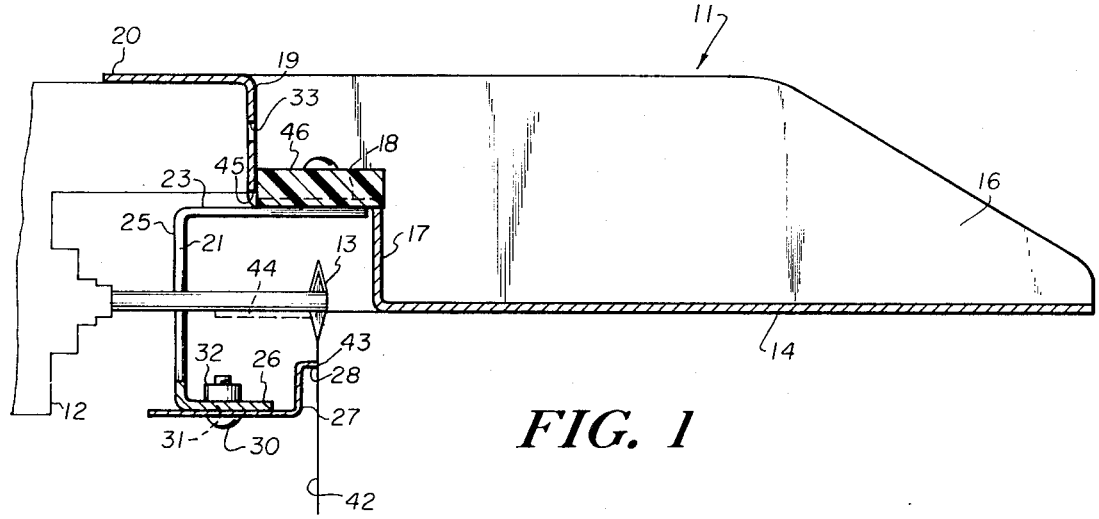
FIG. 1 is a side elevational, cross sectional view of the guide and cutter in position to trim overhang.
Figure 2:
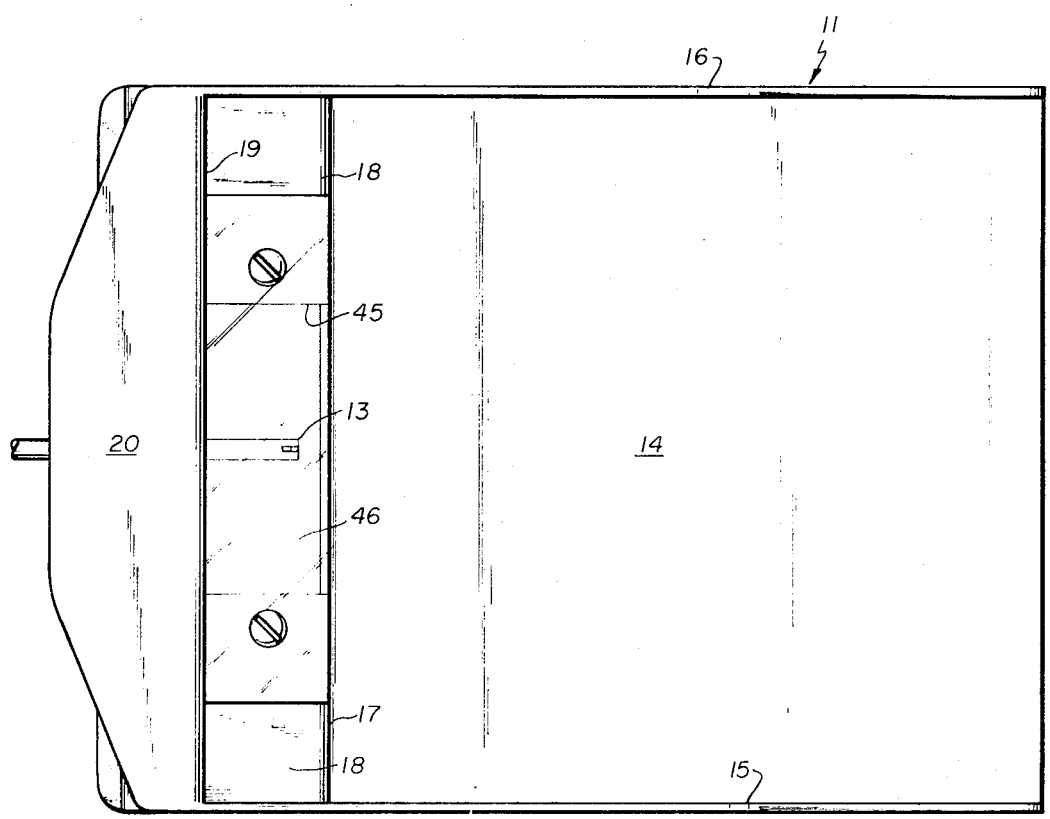
FIG. 2 is a top plan view of the guide and cutter illustrated in FIG. 1.
Figure 3:
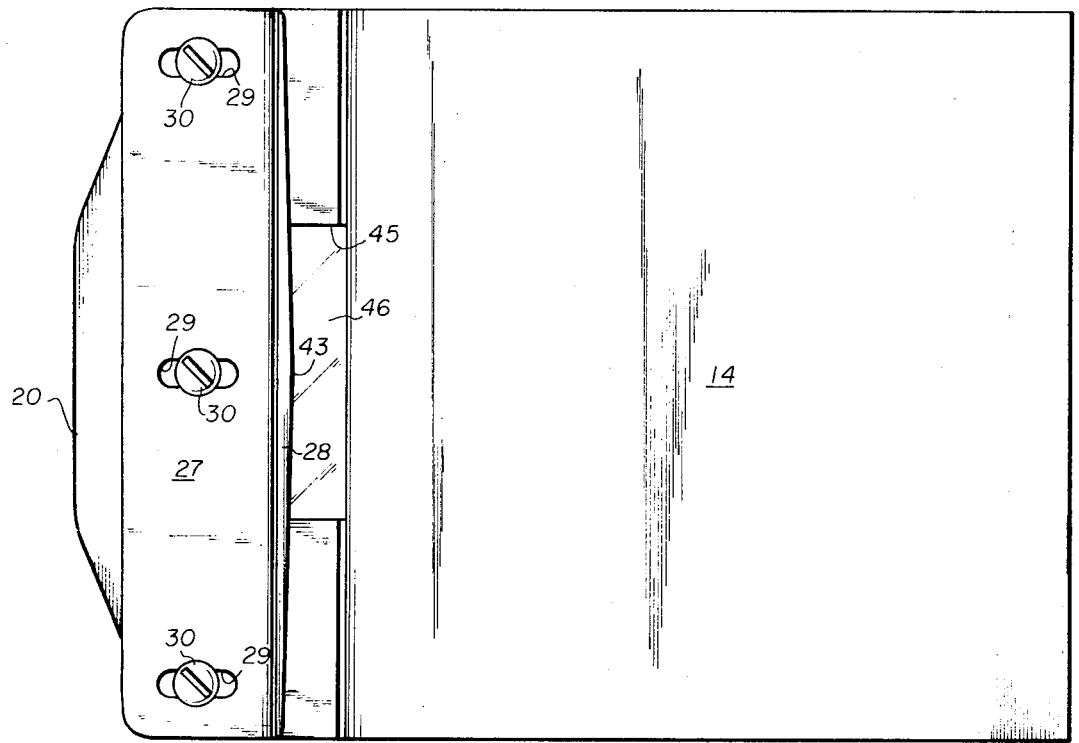
FIG. 3 is a bottom plan view thereof.
Figure 4:
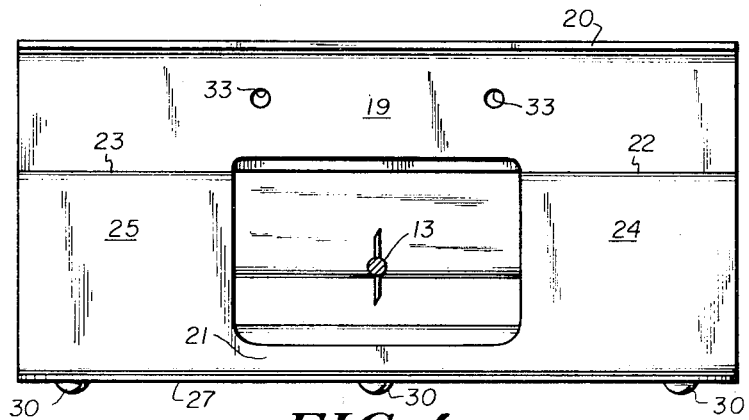
FIG. 4 is a front end elevational view of the guide and cutter.
Figure 5:
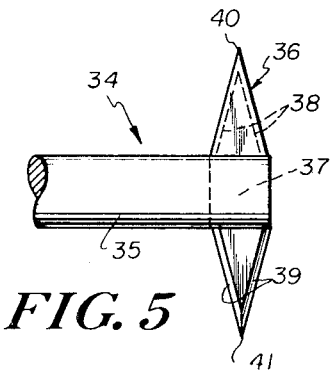
FIG. 5 is an enlarged side elevational view of a cutting instrument.
Figure 6:
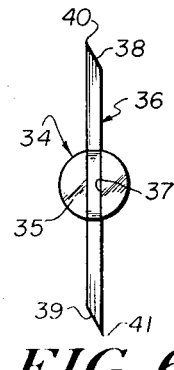
FIG. 6 is an enlarged front elevational view of the cutting instrument illustrated in FIG. 5.

Referring now to the drawings in detail, the guide and cutter comprises a guide 11 detachably secured to a motor 12 which rotatably drives a cutting instrument 13. The motor 12 may be the power-drive for any conventional hand tool and in and of itself does not comprise a part of this invention.

The guide 11 comprises a flat, generally rectangular panel 14 which functions as both a support for the entire assembly as well as a guide for the cutting instrument 13. The panel 14 is provided with a pair of upstanding, generally parallel walls 15 and 16.

An upstanding end wall 17 is formed on the panel 14 along one end thereof generally perpendicular to both the panel 14 and the walls 15 and 16. An extension 18 is formed along the top of the end wall 17 extending generally parallel to the panel 14 outwardly beyond the end wall 17 thereof. The walls 15 and 16 extend beyond the end wall 17 over the top of the extension 18. An upstanding mounting plate 19 is formed on the extension 18. The mounting plate 19 is attached at its opposed ends to the walls 15 and 16 and lies in a plane generally perpendicular to the panel 14. A lip 20 is formed on the mounting plate 19 and extends generally parallel to and in an opposite direction from the panel 14.

An adjustable wall guide 21 is mounted on the extension 18. The wall guide 21 comprises a pair of spaced apart, flat legs 22 and 23 rigidly attached to the extension 18 and extending outwardly away from the upstanding end wall 17 on the panel 14. The legs 22 and 23 are provided with depending portions 24 and 25 respectively and an inwardly extending mounting flange 26 lying in a plane generally parallel to the plane of the panel 14.

An adjustable guide member 27 is detachably mounted on the flange 26. The guide member 27 is provided with a guide edge 28 which extends generally along the end of the panel 14 upon which upstanding end wall 17 is formed. The edge 28 lies generally in a plane parallel to and beneath the plane of the panel 14 and is spaced away from the said end of the panel 14.

The guide member 27 is provided with slots 29, 29 which accommodate fastening bolts 30, 30 extending through holes 31, 31 in the mounting flange 26. Nuts 32, 32 secure the guide member 27 to the flange 26. As a result, the guide member 27 is adjustable to move the guide edge 28 toward or away from the end of the panel 14.

The guide 11 is attached to the motor 12 by means of appropriate mounting bolts (not shown) passing through holes 33 in the mounting plae 18. The lip 20 usually engages the motor 12 and provides additional rigidity.

The cutting instrument 34 comprises a shaft 35 operatively mounted to the motor 12 by means of a conventional chuck (not shown). A flat blade 36 is mounted in a slot 37 in the free end of the shaft 35. The blade 36 is generally diamond-shaped having pairs of sharply intersecting cutting faces 38, 38 and 39, 39. Faces 38, 38 are formed obliquely to the plane of the blade 36 toward each other as are faces 39, 39 but facing in the opposite direction from the faces 38, 38. The tips 40, 41 defined by the intersections of faces 38, 38 and 39, 39 respectively, are oblique to the plane of the blade 36. Preferably, the blade 36 is fabricated of tungsten carbide.

The shaft 35 extends toward the end wall 17 on the panel 14 intruding between the depending portions 24 and 25 of legs 22 and 23. The shaft 35 also lies above the plane of the bottom of panel 14. The blade 36 lies above the edge 28 of the guide member 27 such that the effective point of cut is substantially at the plane of wall 42 to which the edge 28 is engaged.

The guide member 27 is also provided with an upwardly extending offset 43 so that the guide edge 28 lies immediately beneath the tip 40 or 41 of the blade 36. This is important so that irregularities in the plane of the wall 42 perpendicular to the plane of the panel 14 will not unduly displace the point of cut of the blade 36 away from the plane of wall 42. In addition, the guide edge 28 is slightly arcuate in the direction of the panel 14 coming to an apex immediately beneath the blade 36. This accommodates for irregularities in the wall 42 along a plane parallel to the panel 14 and insures contact of the guide edge 28 vertically beneath the axis of rotation of the shaft 35.

A window 45 is provided in the extension 18 above the blade 36 such that the operator may observe the point of cut at all times. For protection, a transparent, plastic, impact resistant lens 46 is mounted over the window 45.

The cutting blade 36 severs the overhang 44 and, because of its diamond shape, imparts a bevel to the cut edge. In addition, since the lateral movement of the cutting instrument 34 is relatively slow with respect to the rotation of the blade 36, there is a persistent overlap of cut which results in a nearly finished edge without the scalloping of the normally used routing tool. In addition, the diamond shape of the blade 36 provides a wedging action in which the width of the initial cut is very small being produced only by the tips 40 and 41 of the blade 36. This reduces fracturing or splintering of the highly polished, brittle surface of the veneer. The cut is widened and the face finished by the passage of aggressively wider portions of the blade 36. The widening consists essentially of a shaving of previously cut portions to a depth predetermined by the angle of the blade 36 from tip to center as well the portion of the guide edge 28. The shaving is so gradual with so much overlap that the cut edge is nearly polished smooth needing little or no hand finishing.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention.

What is claimed is:
1. A guide and cutter comprising:
(a) a flat panel,
(b) a wall guide mounted on the panel at the rear end thereof, a guide edge on the wall guide positioned beneath the plane of said panel, facing forwardly in the direction of the panel and lying generally in a plane parallel to the plane of the panel,
(c) a rotary cutting instrument mounted for rotation in a plane generally perpendicular to the plane of the panel and spaced rearwardly away from the rear end thereof, the plane of cut of the cutting instrument extending downwardly sufficiently to project through the plane of the panel, the lowermost extension of the said plane of cut lying above the said guide edge.

2. A guide and cutter comprising:
(a) the structure in accordance with claim 1 in which
(b) the said edge is slightly arcuate having an apex immediately beneath the cutting instrument.

3. A guide and cutter comprising:
(a) the structure in accordance with claim 1 in which
(b) the wall guide is adjustably mounted to the panel being movable toward and away from the panel.

4. A guide and cutter comprising:
(a) the structure in accordance with claim 1 and
(b) an upstanding wall on the end of the panel to which the said guide is mounted, and
(c) an extension on the top of the said end wall extending in a direction opposite the panel and over the cutting instrument the extension having an opening over the cutting instrument.

5. A guide and cutter comprising:
(a) the structure in accordance with claim 1 in which the cutter is
(b) a rotatable shaft,
(c) a flat generally diamond-shaped blade mounted on the shaft, the blade having a pair of diametrically opposed tips,
(d) the plane of the blade being generally coincident with the axis of the shaft, and
(e) the opposed tips of the blade being equidistant from the axis of rotation of the shaft.

6. A guide and cutter comprising:
(a) the structure in accordance with claim 5 and
(b) pairs of cutting faces on the blade on opposite sides of the shaft.

7. A guide and cutter comprising:
(a) the structure in accordance with claim 1 in which
(b) the said rotary cutting instrument is a flat, generally diamond-shaped blade mounted on one end of a shaft and having a pair of diametrically opposed tips, the plane of the blade being generally coincident with the axis of the shaft, and
(c) the opposed tips of the blade being equidistant from the axis of rotation of the shaft.

8. A guide and cutter comprising:
(a) the structure in accordance with claim 7, and
(b) pairs of cutting faces on the blade on opposite sides of the shaft, the respective pairs of cutting faces being oblique to the plane of the blade in opposite directions, and
(d) the tips of the blade for an edge oblique to the plane of the blade.

References Cited

UNITED STATES PATENTS

| 2,949,826 | 8/1960 | Weber | 30—292 X |
| 1,129,531 | 2/1915 | Waligorski | 30—293 |
| 2,599,415 | 6/1952 | Russell | 30—293 X |
| 3,120,055 | 2/1964 | Baber | 30—289 X |
| 3,148,448 | 9/1964 | Gragg | 30—276 |

FOREIGN PATENTS

| 830,834 | 2/1952 | Germany | 30—289 |

ROBERT C. RIORDON, Primary Examiner

J. C. PETERS, Assistant Examiner

U.S. Cl. X.R.

30—276, 347